(12) United States Patent
Bierner et al.

(10) Patent No.: US 8,095,476 B2
(45) Date of Patent: Jan. 10, 2012

(54) AUTOMATED SUPPORT SCHEME FOR ELECTRONIC FORMS

(75) Inventors: Gann Alexander Bierner, San Bruno, CA (US); Sean Peter Handel, San Bruno, CA (US); Stacey Anne Matinale, San Bruno, CA (US); Bryan Dale Sivak, San Bruno, CA (US); Roger Clifton Neel, San Bruno, CA (US); Christopher Adam Mengel, San Bruno, CA (US)

(73) Assignee: Inquira, Inc., Redwood Shores, CA (US)

( * ) Notice: Subject to any disclaimer, the term of this patent is extended or adjusted under 35 U.S.C. 154(b) by 1036 days.

(21) Appl. No.: 11/945,216

(22) Filed: Nov. 26, 2007

(65) Prior Publication Data
US 2008/0215976 A1    Sep. 4, 2008

Related U.S. Application Data

(60) Provisional application No. 60/867,368, filed on Nov. 27, 2006.

(51) Int. Cl.
G06F 17/00    (2006.01)
G06Q 90/00    (2006.01)

(52) U.S. Cl. .................................................... 705/500
(58) Field of Classification Search ............ 706/46; 705/500
See application file for complete search history.

(56) References Cited

U.S. PATENT DOCUMENTS

| 4,956,774 A | 9/1990 | Shimbamiya et al. |
| 5,321,833 A | 6/1994 | Chang et al. |
| 5,357,436 A * | 10/1994 | Chiu .......................... 701/117 |
| 5,386,556 A | 1/1995 | Hedin et al. |
| 5,442,782 A | 8/1995 | Malatesta et al. |
| 5,535,382 A | 7/1996 | Ogawa |
| 5,608,624 A | 3/1997 | Luciw |
| 5,625,814 A | 4/1997 | Luciw |
| 5,694,523 A | 12/1997 | Wical |
| 5,694,546 A | 12/1997 | Reisman |

(Continued)

FOREIGN PATENT DOCUMENTS

WO    WO 0188662 A2    11/2001

(Continued)

OTHER PUBLICATIONS

Raghavan. S. et al., Crawling the Hidden Web. Computer Science Department, Stanford University, 2001,pp. 1-25, especially pp. 1-15.

(Continued)

Primary Examiner — Jeffrey A Gaffin
Assistant Examiner — Vincent Gonzales
(74) Attorney, Agent, or Firm — Kilpatrick Townsend & Stockton, LLP

(57) ABSTRACT

Actions associated with entering information into different fields of an electronic form are monitored. The types of support provided for entering the information into the different fields can be dynamically varied according to monitored user actions or according to the context or categories of users, fields, or forms. Different types of query or search engines can be used to further identify the context, intent, or meaning of information entered into the different fields. The identified context, intents, or meanings are then used to provide further on-line support. Other analytics of both field entries and user actions can also be used to provide addition help when entering information into the on-line forms.

24 Claims, 11 Drawing Sheets

U.S. PATENT DOCUMENTS

| | | | |
|---|---|---|---|
| 5,742,816 A | 4/1998 | Barr et al. | |
| 5,794,050 A | 8/1998 | Dahlgren et al. | |
| 5,812,865 A | 9/1998 | Theimer et al. | |
| 5,826,269 A | 10/1998 | Hussey | |
| 5,848,399 A | 12/1998 | Burke | |
| 5,873,056 A | 2/1999 | Liddy et al. | |
| 5,873,076 A | 2/1999 | Barr et al. | |
| 5,873,080 A | 2/1999 | Coden et al. | |
| 5,878,423 A | 3/1999 | Anderson et al. | |
| 5,884,302 A | 3/1999 | Ho | |
| 5,890,152 A | 3/1999 | Rapaport et al. | |
| 5,893,091 A | 4/1999 | Hunt et al. | |
| 5,897,622 A | 4/1999 | Blinn et al. | |
| 5,901,287 A | 5/1999 | Bull et al. | |
| 5,913,215 A | 6/1999 | Rubinstein et al. | |
| 5,933,822 A | 8/1999 | Braden-Harder et al. | |
| 5,948,054 A | 9/1999 | Nielsen | |
| 5,963,940 A | 10/1999 | Liddy et al. | |
| 5,966,695 A | 10/1999 | Melchione et al. | |
| 5,974,412 A | 10/1999 | Hazlehurst et al. | |
| 5,987,454 A | 11/1999 | Hobbs | |
| 5,995,921 A | 11/1999 | Richards et al. | |
| 6,006,225 A | 12/1999 | Bowman et al. | |
| 6,016,476 A | 1/2000 | Maes et al. | |
| 6,021,403 A | 2/2000 | Horvitz | |
| 6,026,388 A | 2/2000 | Liddy et al. | |
| 6,028,601 A | 2/2000 | Machiraju et al. | |
| 6,038,560 A | 3/2000 | Wical | |
| 6,052,710 A | 4/2000 | Saliba et al. | |
| 6,061,057 A | 5/2000 | Knowlton et al. | |
| 6,070,149 A | 5/2000 | Tavor et al. | |
| 6,078,914 A | 6/2000 | Redfern | |
| 6,151,600 A | 11/2000 | Dedrick | |
| 6,208,991 B1 | 3/2001 | French et al. | |
| 6,233,547 B1 | 5/2001 | Denber | |
| 6,260,035 B1* | 7/2001 | Horvitz et al. | 706/60 |
| 6,278,996 B1 | 8/2001 | Richardson et al. | |
| 6,282,534 B1 | 8/2001 | Vora | |
| 6,285,998 B1 | 9/2001 | Black et al. | |
| 6,370,535 B1 | 4/2002 | Shapiro | |
| 6,385,592 B1 | 5/2002 | Angles et al. | |
| 6,393,479 B1 | 5/2002 | Glommen et al. | |
| 6,401,084 B1 | 6/2002 | Ortega et al. | |
| 6,401,094 B1 | 6/2002 | Stemp et al. | |
| 6,466,899 B1 | 10/2002 | Yano | |
| 6,471,521 B1 | 10/2002 | Dornbush et al. | |
| 6,477,551 B1* | 11/2002 | Johnson et al. | 715/202 |
| 6,480,843 B2 | 11/2002 | Li | |
| 6,564,213 B1 | 5/2003 | Ortega et al. | |
| 6,584,464 B1 | 6/2003 | Warthen | |
| 6,675,159 B1 | 1/2004 | Lin et al. | |
| 6,766,320 B1 | 7/2004 | Wang et al. | |
| 6,907,414 B1 | 6/2005 | Parnell | |
| 6,928,425 B2 | 8/2005 | Grefenstette et al. | |
| 6,941,301 B2 | 9/2005 | Ferguson et al. | |
| 6,944,711 B2 | 9/2005 | Mogi et al. | |
| 6,957,213 B1 | 10/2005 | Yuret | |
| 7,024,400 B2 | 4/2006 | Tokuda et al. | |
| 7,035,864 B1 | 4/2006 | Ferrari et al. | |
| 7,035,910 B1 | 4/2006 | Dutta et al. | |
| 7,111,290 B1 | 9/2006 | Yates | |
| 7,177,795 B1 | 2/2007 | Chen et al. | |
| 7,181,731 B2 | 2/2007 | Pace | |
| 7,209,921 B2 | 4/2007 | Pace | |
| 7,254,806 B1 | 8/2007 | Yates | |
| 7,428,541 B2 | 9/2008 | Houle | |
| 7,668,850 B1 | 2/2010 | Bierner | |
| 7,672,951 B1 | 3/2010 | Bierner | |
| 7,676,517 B2 | 3/2010 | Hurst-Hiller et al. | |
| 2001/0014888 A1 | 8/2001 | Tsuchida et al. | |
| 2001/0047270 A1 | 11/2001 | Gusick et al. | |
| 2002/0049738 A1 | 4/2002 | Epstein | |
| 2002/0051020 A1 | 5/2002 | Ferrari et al. | |
| 2002/0078090 A1 | 6/2002 | Hwang et al. | |
| 2002/0103809 A1 | 8/2002 | Starzl et al. | |
| 2003/0014403 A1 | 1/2003 | Chandrasekar et al. | |
| 2003/0018512 A1 | 1/2003 | Dortmans | |
| 2003/0037073 A1 | 2/2003 | Tokuda et al. | |
| 2003/0101153 A1 | 5/2003 | Francis et al. | |
| 2003/0144994 A1 | 7/2003 | Wen et al. | |
| 2003/0204435 A1 | 10/2003 | McQuilkin et al. | |
| 2003/0217052 A1 | 11/2003 | Rubenczyk et al. | |
| 2003/0233224 A1 | 12/2003 | Marchisio et al. | |
| 2004/0024739 A1 | 2/2004 | Copperman et al. | |
| 2004/0167870 A1 | 8/2004 | Wakefield et al. | |
| 2005/0080775 A1 | 4/2005 | Colledge et al. | |
| 2005/0120045 A1 | 6/2005 | Klawon | |
| 2005/0149496 A1 | 7/2005 | Mukherjee et al. | |
| 2005/0198563 A1* | 9/2005 | Kristjansson | 715/507 |
| 2005/0203878 A1 | 9/2005 | Brill | |
| 2005/0234969 A1 | 10/2005 | Mamou et al. | |
| 2005/0267871 A1 | 12/2005 | Marchisio et al. | |
| 2006/0059073 A1* | 3/2006 | Walzak | 705/35 |
| 2006/0074836 A1 | 4/2006 | Gardner | |
| 2006/0095326 A1* | 5/2006 | Sandhu et al. | 705/14 |
| 2006/0106769 A1 | 5/2006 | Gibbs | |
| 2006/0122979 A1 | 6/2006 | Kapur et al. | |
| 2006/0136403 A1 | 6/2006 | Koo | |
| 2006/0179404 A1 | 8/2006 | Yolleck et al. | |
| 2006/0253427 A1 | 11/2006 | Wu | |
| 2006/0259483 A1* | 11/2006 | Ozana | 707/5 |
| 2006/0265232 A1 | 11/2006 | Katariya et al. | |
| 2007/0208738 A1 | 9/2007 | Morgan | |
| 2007/0282769 A1 | 12/2007 | Bierner | |
| 2008/0104037 A1 | 5/2008 | Bierner | |
| 2008/0189163 A1 | 8/2008 | Rosenberg | |
| 2008/0243761 A1 | 10/2008 | Guo | |
| 2008/0294651 A1 | 11/2008 | Masuyama et al. | |
| 2009/0077047 A1 | 3/2009 | Cooper | |
| 2009/0083224 A1 | 3/2009 | Dettinger et al. | |
| 2009/0089044 A1 | 4/2009 | Cooper | |

FOREIGN PATENT DOCUMENTS

| | | |
|---|---|---|
| WO | WO 0235376 A2 | 5/2002 |
| WO | WO/2007/134128 | 11/2007 |
| WO | WO/2008/022150 | 2/2008 |
| WO | 2008067316 | 5/2008 |

OTHER PUBLICATIONS

Madhavan et al "Semantic Mappings for Data Mediaion", Feb. 2002, <pages.cs.wisc.edu/~anhai/talks/JayantMadhavan-Affiliates2002. ppt>, p. 1-17.

Chien, Steve, et al. "Semantic similarity between search engine queries using termporal correlation." In Proceedings of the 14th international conference on World Wide Web, Chiba, Japan. Session: Usage analysis, p. 2-11. Published May 10-14, 2005. [retrieved Jan. 21, 2008]. Retrieved from the Internet: <URL: http://www.ra.ethz.ch/CDstore/www2005/docs/p2.pdf>.

Don Clark, "AnswerFriend Seeks to Sell Question-Answering Software," Wall Street Journal, Aug. 24, 2000.

Deniz Yuret, "Discovery of Linguistic Relations Using Lexical Attraction" PhD Thesis, MIT, May 15, 1998.

Deniz Yuet "Lexical Attractino Modes of Language." Submitted to The Sixteenth National Conference on Artificial Intelligence, 1999.

Boris Katz, Deniz Yuret, et al. "Integrating Large Lexicons and Web Resources into a Natural Language Query System." To appear in Proceedings of the IEEE International Conference on Multimedia Computing and Systems, 1999.

International Peliminary Report on Patentability and Written Opinion of the International Searching Authority for PCT/US2007/068597; International Searching Authority/US; Nov. 11, 2008.

International Search Report for PCT/US2007/068597; International Searching Authority/US; May 22, 2008.

International Preliminary Report on Patentability and Written Opinion of the International Searching Authority for PCT/US2007/075929; International Searching Authority/US; Feb. 17, 2009.

International Search Report for PCT/US2007/075929; International Searching Authority/US; Jan. 21, 2008.

International Preliminary Report on Patentability and Written Opinion of the International Searching Authority for PCT/US2007/085646; International Searching Authority/US; Jun. 3, 2009.

International Search Report for PCT/US2007/085646; International Searching Authority/US; Jul. 23, 2008.
International Search Report for PCT/US2001/15711; International Searching Authority/US; Nov. 6, 2001.
International Preliminary Examination Report for PCT/US2001/15711; IPEA/US; Date of completion of report Feb. 16, 2005.
Stolowitz Ford Cowger LLP, Listing of Related Cases, Aug. 19, 2009.

Internet Archive, Wayback Machine, website pages from LLBean, Feb. 29, 2000.
Baeza-Yates et al., "Query Recommendation Using Query Logs in Search Engines", Mar. 2004, Current Trends in Database Technology—EDBT 2004 Workshops, pp. 588-596.

* cited by examiner

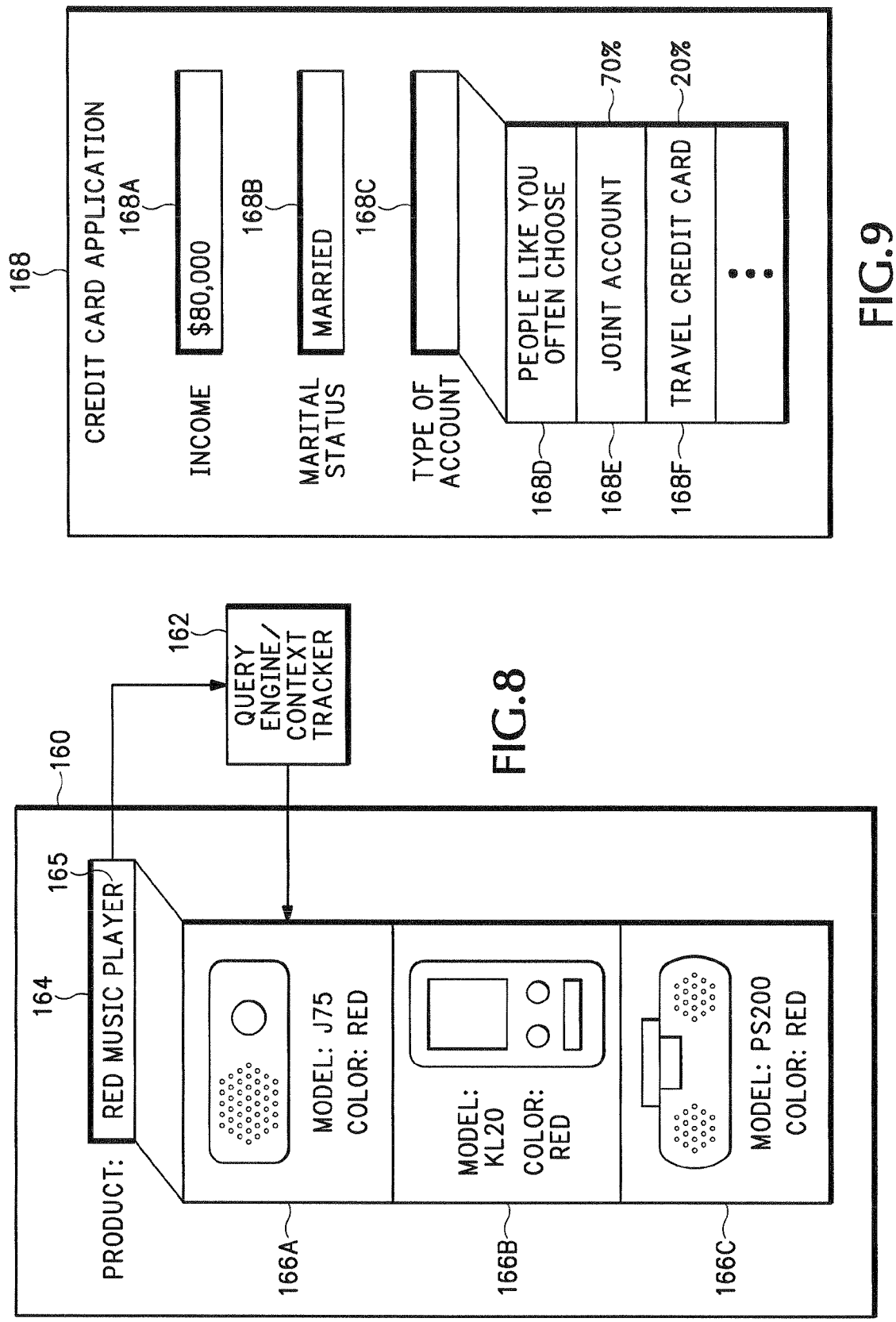

AUTOMATED SUPPORT SCHEME FOR ELECTRONIC FORMS

The present application claims priority to provisional patent application Ser. No. 60/867,368 entitled: AUTOMATED SUPPORT SCHEME FOR ELECTRONIC FORMS which is incorporated by reference in its entirety.

BACKGROUND

Internet transactions often require a user to enter information into one or more electronic forms. For example, the user may first have to enter specific information into a field or form that identifies the product the user wishes to purchase or identifies the transaction the user wishes to conduct. The web application then provides the user with the electronic forms associated with the requested product or transaction. For example, purchasing items on a web site may require a user to first select an item and then fill out a form that requires the user to input both personal information and credit card information.

In another example, a user may want to apply for a credit card, home loan, or other financial service over the Internet. This also requires the user to fill out one or more complex electronic forms that require the user to fill in multiple different fields related to personal, financial, and demographic information.

Usually the user fills in all of the requested fields in the form and then submits the form back to the web site for verification and execution. In some web applications, some of the information verification may be performed as the user is entering the data into the electronic forms. For example, the web page may have some intelligence that verifies the user has entered a valid credit card number.

Either way, any incorrectly entered information usually results in the user receiving a cryptic message, such as "invalid entry please reenter". These problems entering information into electronic forms can be extremely frustrating to the user. For example, the user may not understand what information the form is requesting. Even when the type of information is known, the user may not understand how the information should be input into the form. For example, should a social security number include dashes or spaces between groups of numbers?

If the frustration level gets too high, or the correct information cannot be determined, the user may terminate the entire electronic transaction. This, of course, results in the enterprise losing business and defeats one of the primary purposes of conducting transactions on line, convenience.

BRIEF DESCRIPTION OF THE DRAWINGS

FIG. 8 is a diagram showing how a query engine or content tracker can be used to present different suggestions for filling out fields in a form.

FIG. 9 is a diagram showing how different fields in a form can be automatically filled out or presented with suggestions for filling out according to information input into other fields.

DETAILED DESCRIPTION

Figure 1:
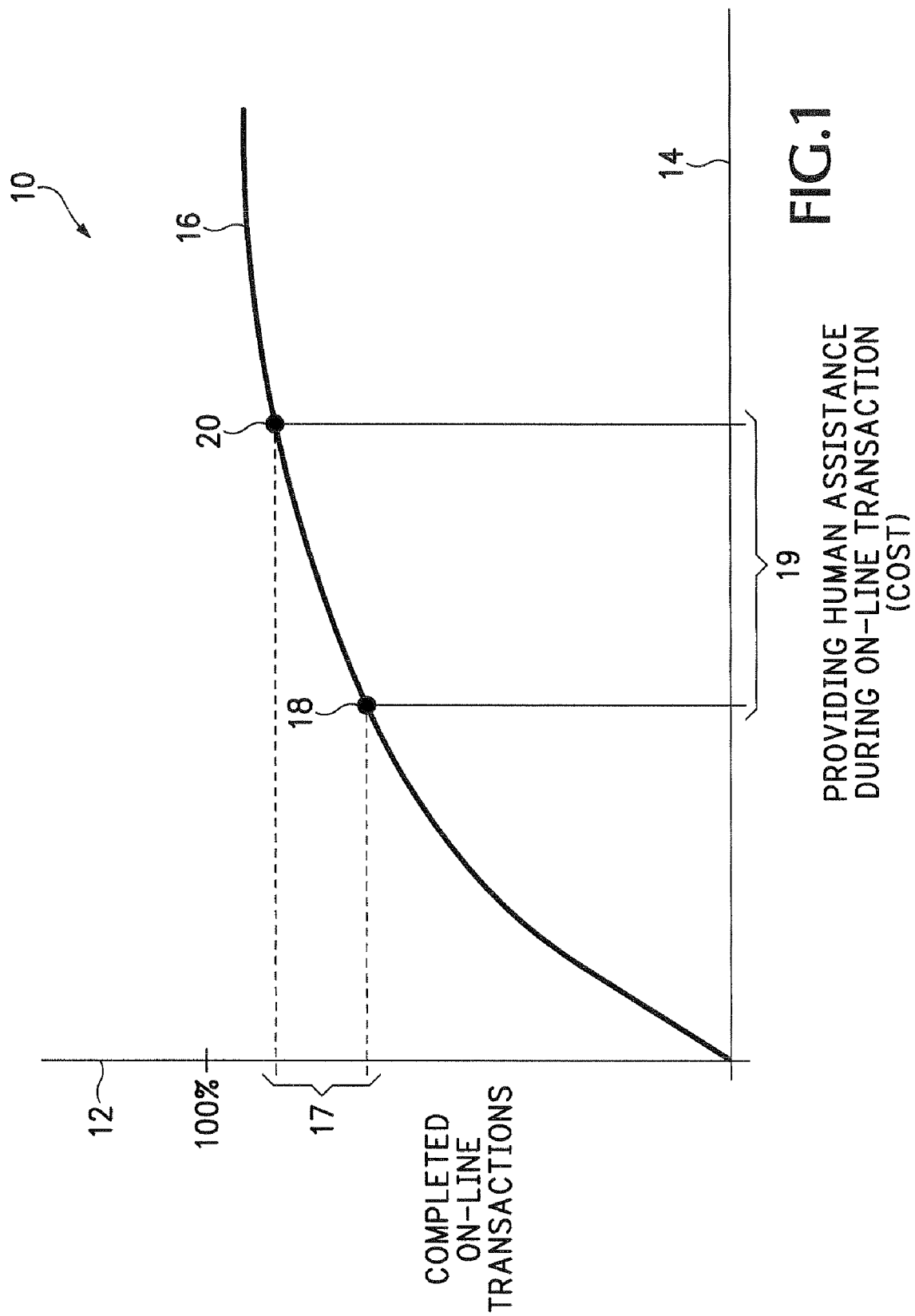
FIG. 1 is a graph showing how completing on-line transactions relate to enterprise cost.

FIG. 1 is a graph 10 showing the relationship between completed on-line transactions and cost. The vertical axis 12 represents the percentage of on-line transactions successfully completed and the horizontal axis 14 represents the cost to the enterprise for providing human assistance to complete the on-line transactions. The yield curve 16 indicates that providing more human assistance during a web transaction (cost) typically results in more completed on-line transactions.

Yield curve 16 also shows that there may be a point of diminishing returns with respect to the cost of providing human support for on-line transactions. For example, up to location 18, increased human support during web transactions yields relatively high increases in the percentage of completed transactions. However, location 20 on curve 16 shows that a substantially large amount of additional support cost 19 yields a relatively smaller increase 17 in the percentage of completed transactions. In other words, increasing the number of successfully completed transactions beyond location 18 to location 20 may not be justified by the additional cost 19 related to providing additional human assistance.

The yield curve 16 and the break even point between completed on-transactions and cost can, of course, vary depending on the profit associated with the particular on-line transaction, the amount of human assistance required to complete the on-line transaction, and other business factors related to the on-line transaction.

Graph 10 illustrates the cost advantages of reducing the amount of required human interaction while at the same time maintaining a high percentage of completed on-line transactions. Thus, one goal for an enterprise may be to operate an area around the "sweet spot" of curve 16 where the largest number of completed transactions can be provided by a minimal amount of on-line support cost 14.

Support schemes are described below that reduce the amount of human interaction necessary for users to successfully complete a higher percentage of on-line transactions. These support schemes, in essence, attempt to replicate, in an automated manner, the type of support a user is accustomed to receiving when filling out a paper form, say at a bank with the help of a bank representative. Certain operations provided by the form support schemes can be used to completely avoid using human on-line support. However, the forms described below are also more efficient at providing human support only when necessary. For example, the forms can delay providing human support until it is more clearly evident that the user will terminate the transaction if some level of human interaction is not provided. In other words, human interaction is not prematurely initiated, thus wasting transaction costs.

Overview

Actions associated with entering information into different fields of an electronic form are monitored. The types of support provided for entering the information into the different fields can be dynamically varied according to monitored user actions or according to the context or categories of users, fields, or forms. Different types of query or search engines can be used to further identify the context, intent, or meaning of information entered into the different fields. The identified context, intents, or meanings are then used to provide further on-line support. Other analytics of both field entries and user actions can also be used to provide addition help when entering information into the on-line forms.

Context Sensitive Support

Figure 2:
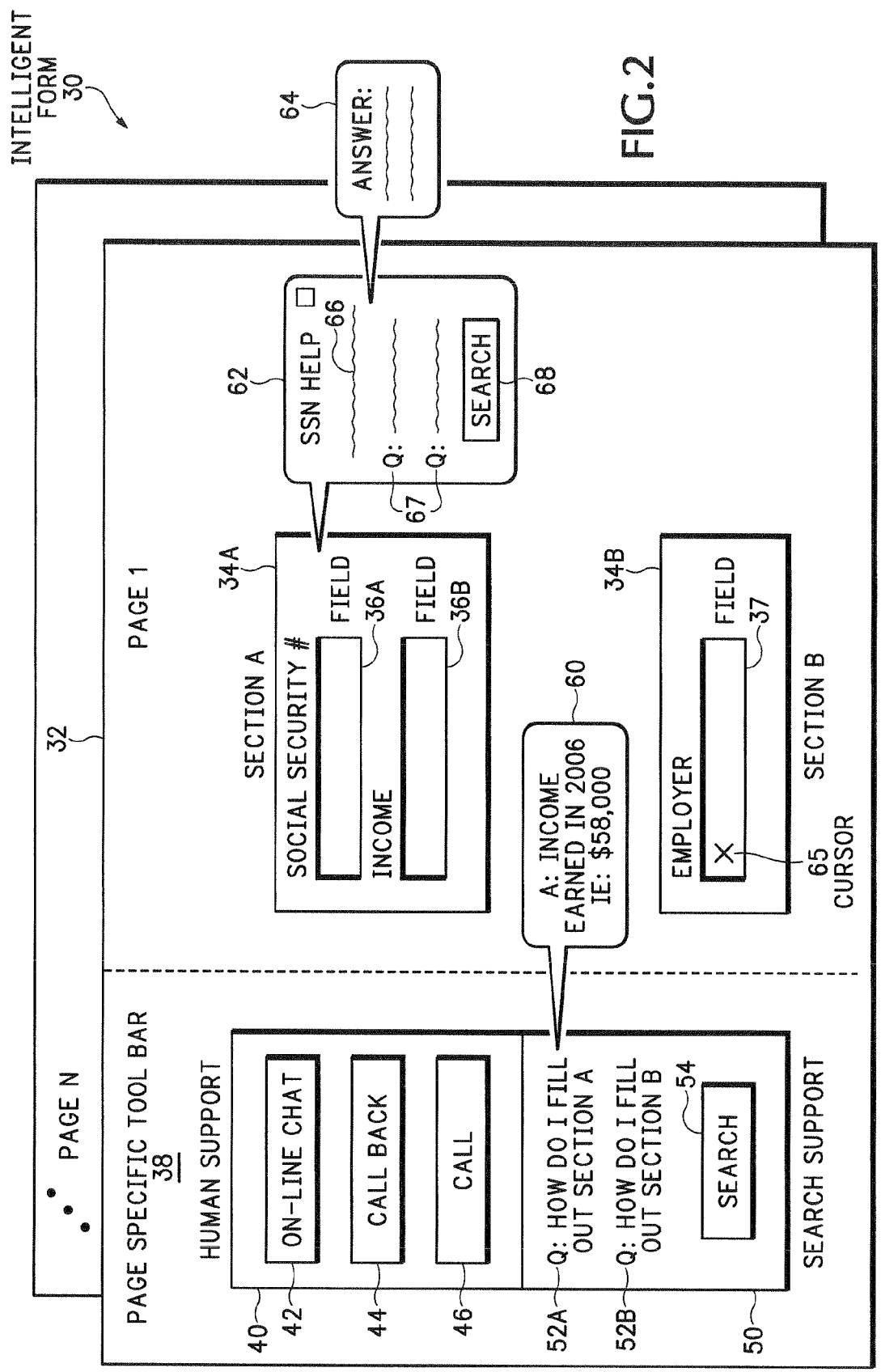
FIG. 2 is a diagram showing one example of ways a form can provide additional user support.

FIG. 2 shows an electronic form 30 that is sent from an enterprise web server to a user terminal and displayed on a computer screen. The electronic form 30 can relate to any type of information or transaction that may require a user to enter information. Examples of different types of transactions may be given below, but it should be understood that these examples are used only for illustrative purposes and other applications can also be used.

The form 30 may include multiple web pages 32 that each can include different sections 34A and 34B. The sections 34A and 34B can include different fields 36 and 37, respectively. A tool bar section 38 may also be located on the page 32 and can contain specific support tools or information associated with the context of page 32. For example, page 32 may be part of an electronic form 30 used to apply for a home mortgage. Section 34A may be related to the loan applicant's personal information and section 34B may be related to the loan applicant's employment history. Field 36A may require the user to enter their social security number, field 36B may require the user to identify their annual income, and field 37 may require the user to identify a current employer.

The web application that includes providing form 30 generates a tool bar 38 that is specific to the particular context of page 32. The tool bar 38 may include a search support section 50 associated with the information or context of web page 32. In this instance, as soon as page 32 is displayed, the tool bar 38 may display questions 52A and 52B that are commonly asked by users while filling out the personal information in section 34A or filling out the employer information in section 34B. For example, question 52A may ask the question "HOW DO I FILL OUT THE SOCIAL SECURITY FIELD 36A AND INCOME FIELD 36B IN SECTION 34A". Similarly, question 53B may display the question "HOW DO I FILL OUT THE EMPLOYER FIELD 37 IN SECTION 34B".

The user can select question 52A by hovering the mouse or clicking a mouse button, for example, on that specific display area. A popup window 60 may then immediately be displayed that answers the selected question 52A. In this example, the popup 60 may further explain what information is required for field 36B and give an example of how to properly enter the information.

The specific questions 52A and 52B may also dynamically change depending on the section 34 or field 36A, 36B, or 37 the user is currently entering information or currently positioning a cursor. For example, the user may currently be entering information into the employer field 37 of section 34B. The form 30 may accordingly change the questions 52 to correspond to field 37.

For example, the questions 52A and 52B may automatically be changed to display the most common user questions asked while filling out field 37. This could include a first question like "Q: WHAT EMPLOYER INFORMATION IS REQUIRED". A second employer related question 52 may ask "Q: I DON'T KNOW MY EMPLOYER'S ADDRESS". The user, by selecting the first question, may be provided an answer in popup 60 "A: INCLUDE EMPLOYER STREET ADDRESS, CITY AND ZIP CODE." Selecting the second question may cause the form to display an on-line search directory that may search an entered employer name for an associated street address, state, and zip code.

The tool bar 38 may also include a search box 54 for conducting searches related to the context of page 32. For example, as described above, the context of page 32 may be related to entering personal and employer information for a loan application. The search engine receiving inputs from search box 54 may automatically consider the intent for the search question to be associated with supplying social security number, income, and employer information for a loan application.

Accordingly, the search engine may be able to more accurately answer the questions submitted in search box 54. For example, the user may have currently moved a computer cursor 65 into employer field 37. The user may then type in the text "ACME INSURANCE COMPANY" into search box 54. The search engine then knows that the context of the question is related to the name and address of user's employer for field 37. Accordingly, the search engine may search either through internal or external databases for the address of the Acme Insurance Company.

Initiating a search in search box 54 can also automatically repopulate the toolbar 38 with questions 52 associated with the search request and current use area in page 32. For example, the user may enter a search request in search box 54 "SHOE STORE IN SAN FRANCISCO". If the cursor is currently located in field 37, the question 52A may be changed for example to: "Q: WHAT IS THE NAME AND ADDRESS OF THE SHOE STORE IN SAN FRANCISCO, CALIFORNIA WHERE I WORK?" Selecting question 52A could then list shoe stores in San Francisco, Calif. Or, the shoe stores could be listed immediately without the intermediate step.

Additionally or in an alternative embodiment, some or all of the information contained in toolbar 38 may be displayed in popup windows. The information contained in popup window 62 is associated with the section 34, or field 36, currently being used. For example, the popup window 62 may be automatically displayed when the computer cursor hovers over the social security field 36A for some threshold period of time or when the user selects a mouse key while the cursor is hovering over field 36A. The popup window 62 may possibly include both text 66 explaining what information should be entered into field 36A, questions 67, and a search box 68 that all provide help with entering a social security number into field 36A of web page 32.

If the user initiates a search by entering a question into search box 68, the general description text 66 and questions 67 may be updated based on the context of the search request and the particular location of the cursor in page 32. For example, the user may enter the query "information security" into search box 68 while the cursor is currently located in social security field 36A. The web page 32 may then present new text 66 and new questions 67 explaining or asking questions about how privacy is maintained for a social security number entered into field 36A.

Moving the cursor and selecting one of the questions displayed in popup window 62 may cause another popup window 64 or other user interface embodiment to be displayed that answers the selected question 67. For example, one of the questions 67 may ask if it is necessary to enter a social security number into field 36A. Hovering over this question 67, may display popup window 64 which then tells the user to contact a call center operator if they would like to disclose their social security number over the phone. The search can alternatively be based on the user profile so that only certain users get particular search results.

The form 30 can also provide tooltips for field specific text. For example, the page 32 can automatically insert a tool tip whenever a particular word or phrase is entered. Any other type of user interface can alternatively be used that displays and searches for information associated with the particular location (section, field, page, form) where the user is currently entering information. In one embodiment, all of the help information either shown in the toolbar 38 or displayed in the popup windows is maintained in an information manager and is then pulled into form 30 according to the context surrounding the question such as form location, field subject matter, question, etc.

It is also worth noting that all of the help information provided either in the toolbar 38 or in the popup windows 60, 62, and 64 all shows up on the web page 32 while the user is hovering the cursor over different page locations. This prevents the user from having to leave web page 32 and open other web pages for help information. This is both convenient, more inherent to the user, and prevents the user from accidentally closing web page 32 and losing previously entered information.

Figure 3:
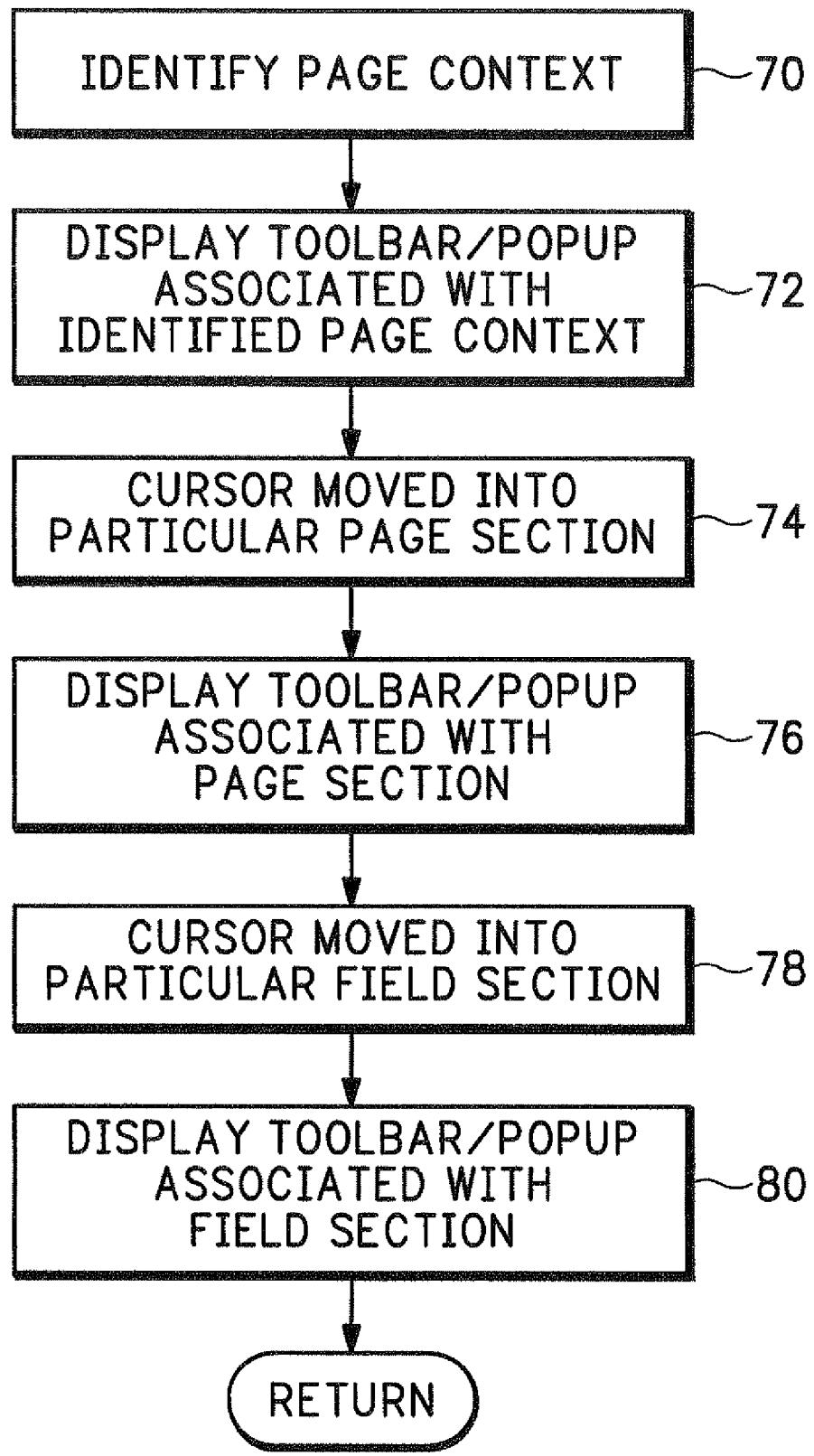
FIG. 3 is a flow diagram showing how the form can display different support windows on a web page according to where the user has located a cursor.

FIG. 3 shows generally some of the context sensitive support operations provided by form 30. Referring to FIGS. 2 and 3, software on the user's computer in operation 70 identifies a context associated with the webpage 32. This could be a simple matter of the web page 32 including meta data that identifies a particular subject matter. Other context information could also be determined by analyzing the different sections 34 and fields 36A, 36B, and 37 contained in the web page 32.

In operation 72, the toolbar 38 is displayed with the particular help information associated with the identified web page context. Cursor movements are monitored while the user is interacting with page 32. If the cursor is detected moving into a particular section of the webpage in operation 74, the toolbar 38 may then be automatically updated to display help information associated with the identified section in operation 76. Further, if the cursor is detected moving into a particular field of the web page 32 in operation 78, then the toolbar may be updated to display help information associated with the identified field in operation 80.

Detecting User Problems

Call center agents or automatic voice recognition systems can often determine if a customer calling on the phone for support is frustrated based on the tone of the customers voice, the curtness of the response, or other types of responses. When the customer tone or actions indicate dissatisfaction or frustration, the customer may be immediately transferred to a supervisor or be provided more accommodating responses or actions.

The intelligent form 30 shown in FIG. 2 may also try to determine when a user is frustrated, dissatisfied, or having problems entering information into the electronic form and then automatically provide proportional help responses. These determinations can be based on the types of questions the user is asking in a help support window, the types of inputs the user is entering into fields, or the physical actions of the user while entering information into the fields of the electronic form. Other user information can also be used to determine the user's mental state while filling out the form 30.

Figure 4:
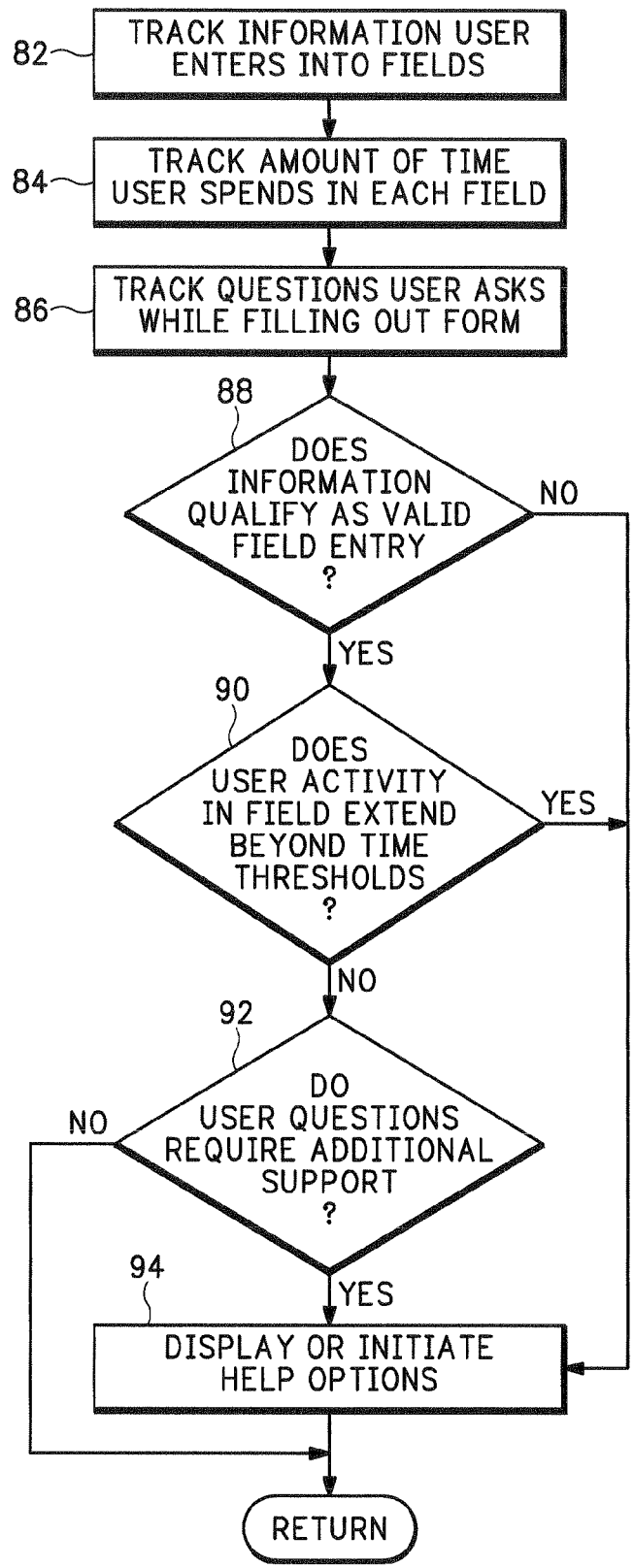
FIG. 4 is a flow diagram showing how the form can supply support according to an amount of time spent filling out a field or according to types of questions asked while filling out the field.

Referring to FIGS. 2 and 4, the intelligent form 30 may be sent by the enterprise web site with software that detects different user activities. In operation 82 of FIG. 4, the form may track the types of information entered into the different fields shown in FIG. 2. For example, the form may determine if a valid social security number is entered into field 36A and valid dollar sign "$", commas, and numbers are entered into the income field 36B.

In operation 84, the form 30 can also track the amount of time the user spends entering information into the different fields of form 30. For example, as soon as a user moves a cursor into one of fields 36 or 37 or completes a previous field, the form 30 then tracks the amount of time it takes the user to complete the field and move the cursor 65 to another field. The form 30 can also track other time parameters. For example, the form 30 may track the amount of time required for the user to enter individual characters into the fields or the amount of time it takes the user to complete a specific section 34 of web page 32. Operation 86 in FIG. 4 tracks the types of questions the user enters into the search box 54 while filling out form 30.

In operation 88, the form 30 may then determine if the information entered by the user qualifies as a valid entry. For example, the user may enter text into the social security number field 36A. The form 30 may then display or initiate additional help options in operation 94 when incorrect data has been entered. For example, a popup help window or other help operations described both above and below may be displayed on the web page that inform the user that numbers must be entered into field 36A.

In another embodiment, the user may enter information into the field, but repeatedly deletes the previously entered information. If the user deletes the previously entered information more than predetermined number of times, the form 30 may automatically display a help window.

Operation 90 determines if the user activity in the field extends beyond one or more time thresholds. In one example, each field 36 and 37 in form 32 may have a predetermined time threshold for completion. As soon as the user moves cursor 65 into a particular field, the form 30 tracks the amount of time required for the user to complete entering information into the field and then move the cursor into another field. The time threshold may be, for example, configured directly or computed from the time others have taken to complete the field.

If the amount of time extends beyond the predetermined time threshold, the form 30 may automatically display or initiate help options in operation 94. For example, a popup window may be displayed in FIG. 2 that asks the user if they are having problems and possibly present questions that may be related to the possible problem. For instance, a popup window may be displayed when the cursor is located in field 36A beyond some threshold time period:

It appears that you are having a problem entering your social security number.

Q: I can't remember my social security number

Q: I don't want to send my social security number over the Internet

Ask a question [ Search ]

In another example, the user may enter some portion of information into a particular field in a timely manner. However, then user may then have an inordinately long delay while entering the remaining information into a particular section. For example, the user may enter an employer name into field 37 of FIG. 2 in less than 30 seconds, but then delay another minute without entering any employer address information. The form 30 can detect these delays between different entries within the same section and accordingly display or initiate help options in operation 94.

Any variety of different time factors may be monitored and can vary depending on the type of information required to be entered into the field or the types of activities or non-activities monitored while in that particular field. For example, the help window may only pop up when the user does not enter any information into the selected field for some threshold time period. As long as the user is entering information, the timer associated with that field may constantly be reset.

The form 30 can also distinguish user hesitation or confusion from a user that has say stepped away from their desk or is disrupted by other activities. For example, the form 30 can detect an active user that continues to type characters into a field of form 30 or continues to move the cursor. Alternatively, no mouse or keyboard activity for some period of time may indicate the user is not currently working on form 30. In this case, the form may delay presenting help options until it is clear from the keyboard and mouse activities that the user is actively working on the form.

The form 30 can also query the user to determine if the user is still at their terminal. If there is no response back from the user within some amount of time, the form 30 can automatically save the previously entered information. The save information can then be provided to the user next time the user enters the web site. For security reasons, the user's partially completed form information may be stored on the enterprise server, rather than on the user's terminal. To retrieve the partially completed form at a later time, the user can re-authenticate (if he was previously logged into a registered account). If the user was not using a registered account when he partially completed the form in the first session, the system would ask the user a few questions related to what he originally filled in on the form as a form of authentication.

In operation 92 of FIG. 4, the form 30 can identify questions entered into the search box 54 of FIG. 2 that indicate user frustration or confusion. For example, the user may enter the question "FOOTBALL" into a search box 54 while the cursor is located in the social security number field 36A. The form 30 may determine that the question "FOOTBALL" is unrelated to social security numbers and automatically display a popup window providing additional support. Other types of questions entered into search box 54 may also indicate user confusion or frustration. For example, the user may enter the question "I DON'T UNDERSTAND THE QUESTION" or enter the question "I AM MAD" into search box 54. The intent or context of these questions indicates a user problem or user frustration. Accordingly, the form 30 displays or provides additional support to the user in operation 94.

FIG. 2 also shows some of the types of help options that can be displayed or initiated in operation 94 of FIG. 4 when the form 30 identifies a confused or frustrated user. A human support section 40 may automatically be displayed that identifies different types of user selectable help support. In one example, the user can select an on-line chat box 42. This automatically opens up a popup window or screen where the user could discuss problems with an enterprise operator via an on-line chat room.

Alternatively, the user may select a call back box 44 that automatically sends a message to an enterprise operator to call the user over a phone line. The phone number of the user could have previously been entered into the form 30 or the user may have previously provided their phone number when initially registering on the web site. Still further a phone number field may automatically pop up (and possibly be pre-filled) when the user selects call back box 44. Any of these techniques identify a user phone number that the enterprise operator can then use to talk to the user via a phone line and attempt to resolve any issue regarding form 30. In yet another help option, the user can select call box 46 that then either displays an enterprise support phone number or automatically calls a phone number that connects the user with a call center agent.

In one embodiment, the chat room address associated with box 42 or the phone numbers displayed or used in boxes 44 and 46 may again be associated with the particular context of page 32, or the particular section 34 or field 36 or 37 currently being used by the user For example, if the page 32 is associated with a home loan, selecting any of boxes 42, 44, of 46 may automatically connect the user with an enterprise call center agent qualified to answer questions related to home loans.

In another example, the web page may be associated with a cellular phone company and the cursor may currently be located in a section of the web page used for answering cellular telephone problems. If the user selects box 42, the form would connect the user to an on-line chat room that is operated by a call center agent that specializes in resolving problems with cell phones. Additionally, the call center agent may be provided with the information already entered into the form to help in providing a solution.

Thus, the intelligent form 30 not only determines if the user is actively working on the form but can also detect user problems or frustration based on the types of questions the user is asking and the time required to fill out forms and particular fields in the forms.

Prioritizing User Support

Human support may not necessarily be provided every time a user is having a problem filling out a form. For example, some types of on-line transactions as described in FIG. 1 may not provide enough profit to the enterprise to warrant automatic human operator support. In these situations, the user may have to manually call a general phone number provided on the home page of the web site to obtain help. On other forms, a phone number may be automatically displayed on the web page, but only after the user has spent some inordinate amount of time struggling with a particular field. These time thresholds and levels of human operator support can vary according to the types of transactions associated with the forms.

Figure 5:
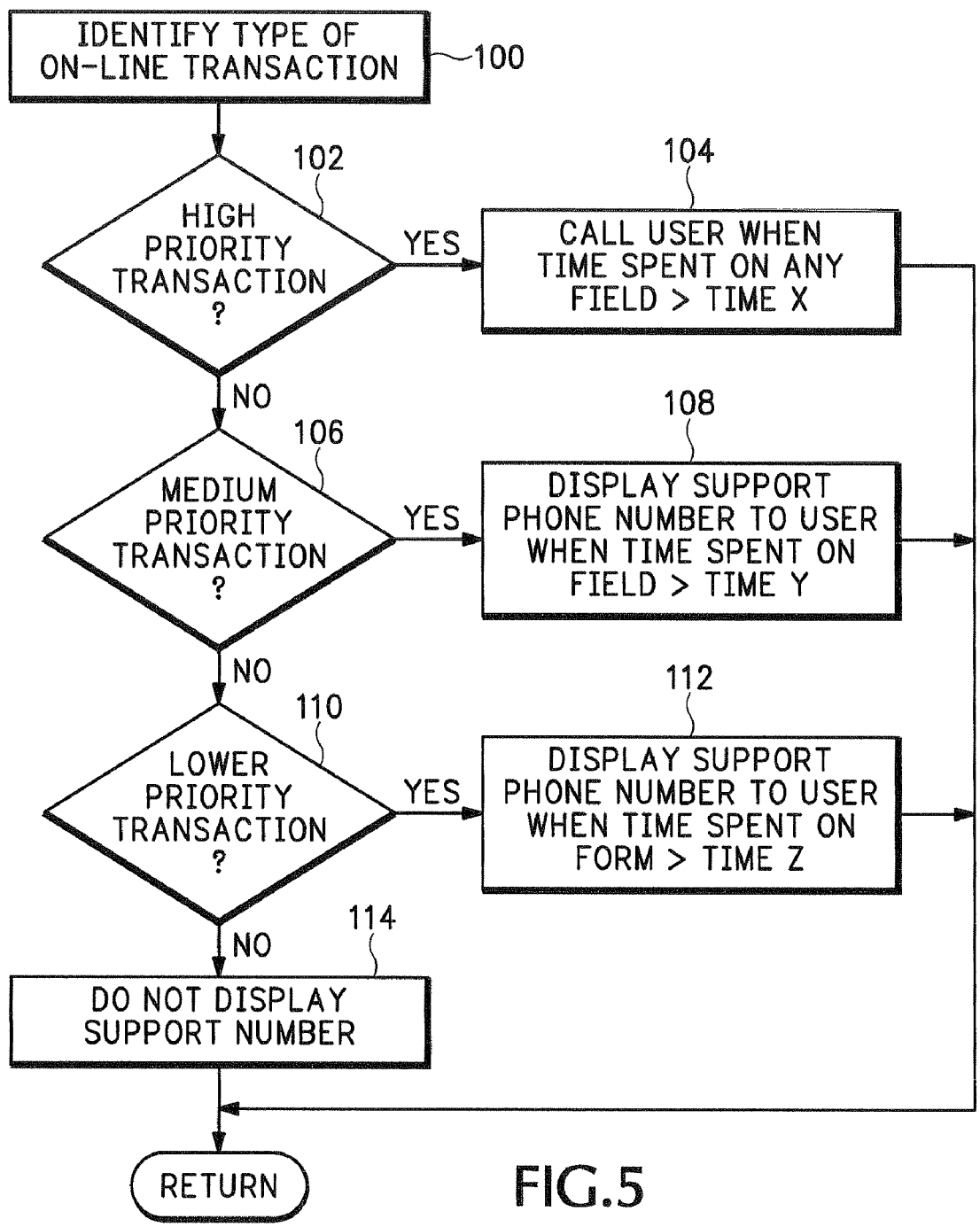
FIG. 5 is a flow diagram explaining how different levels of support are provided according to a level of priority for the transaction associated with the form.

FIG. 5 shows one example of different levels of support that may be provided based on the value of the transactions associated with particular forms. In operation 100, the form identifies the type of on-line transaction that is associated with the current form. This is easily performed either by assigning forms a particular label, tag, value, index, etc., that can then be directly used or used as an index into a table to identify an associated type of transaction or transaction value. Other parameters may also be used to identify different transaction priorities, such as information the user enters into particular form fields. This is described in more detail below in FIG. 6.

The form 30 may identify the associated transaction as high priority in operation 102. Accordingly, the form in operation 104 may automatically notify a call center agent whenever the user spends more than some amount of time X on any particular field of the form. If the transaction is of high enough value, the form may notify the call center agent to call the user or chat on-line with the user regardless of any observed user problems. The call center agent could then talk the user through the entire form.

The form may identify the associated transaction as medium priority in operation 106. In this situation, the form may not cause a call center agent to call the user whenever there is a detected problem or when the time spent in a field is greater than time X. Alternatively, the form may automatically display a support phone number or support chat session on the web page only after the user spends more than some second amount of time Y working on a particular field. Times X and Y could be the same or time Y may be greater than time X. Medium priority transactions are provided with a lower level of human support since, in this example, the user is now required to call the call center agent instead of the call center agent calling the user.

In operation 110 the form may determine the associated transaction is of relatively lower priority. For example, the form may be associated with a credit card application that may have relatively low profit potential for the financial service enterprise providing the form. In this example, the form in operation 112 may only display a support phone number on the web page when the user has spent some threshold amount of time Z working on the entire form. Other forms in operation 114 that are associated with other even lower priority or no-priority transactions may not offer any human support options.

Thus, a form related to the relatively low value credit card application transaction in operation 110 may have an overall page related time threshold of 10 minutes before a call number is automatically displayed to the user in operation 112. Alternatively, a form related to a relatively high value home finance transaction in operation 102 may automatically display a help support phone number in operation 104 or actually have a call center agent call the user whenever a user spends more than say 1 minute on any one particular field in the associated form.

The support threshold can also be based in part or in whole on the current support staffing level and the relative number of concurrent users who may need help. Thus, at time x, a medium level support need may get escalated to an agent, but at time y, when the support queue is full of higher-priority users or transactions, the case may not get escalated.

Any combination of these different support thresholds can be used to provide automated form support according to the transaction value vs. support cost considerations associated with the form. In some high priority transactions, the call center operator may actually monitor the form while the user is entering information and then automatically call the user and offer to enter the information into the fields for the user by remotely accessing the form. Existing collaboration software can be used with this support feature that allow multiple remote users to concurrently access and modify the same electronic document. This further reduces the potential for user frustration by having the call center agent actually fill out the form.

Demographic Based Help Support

Figure 6:
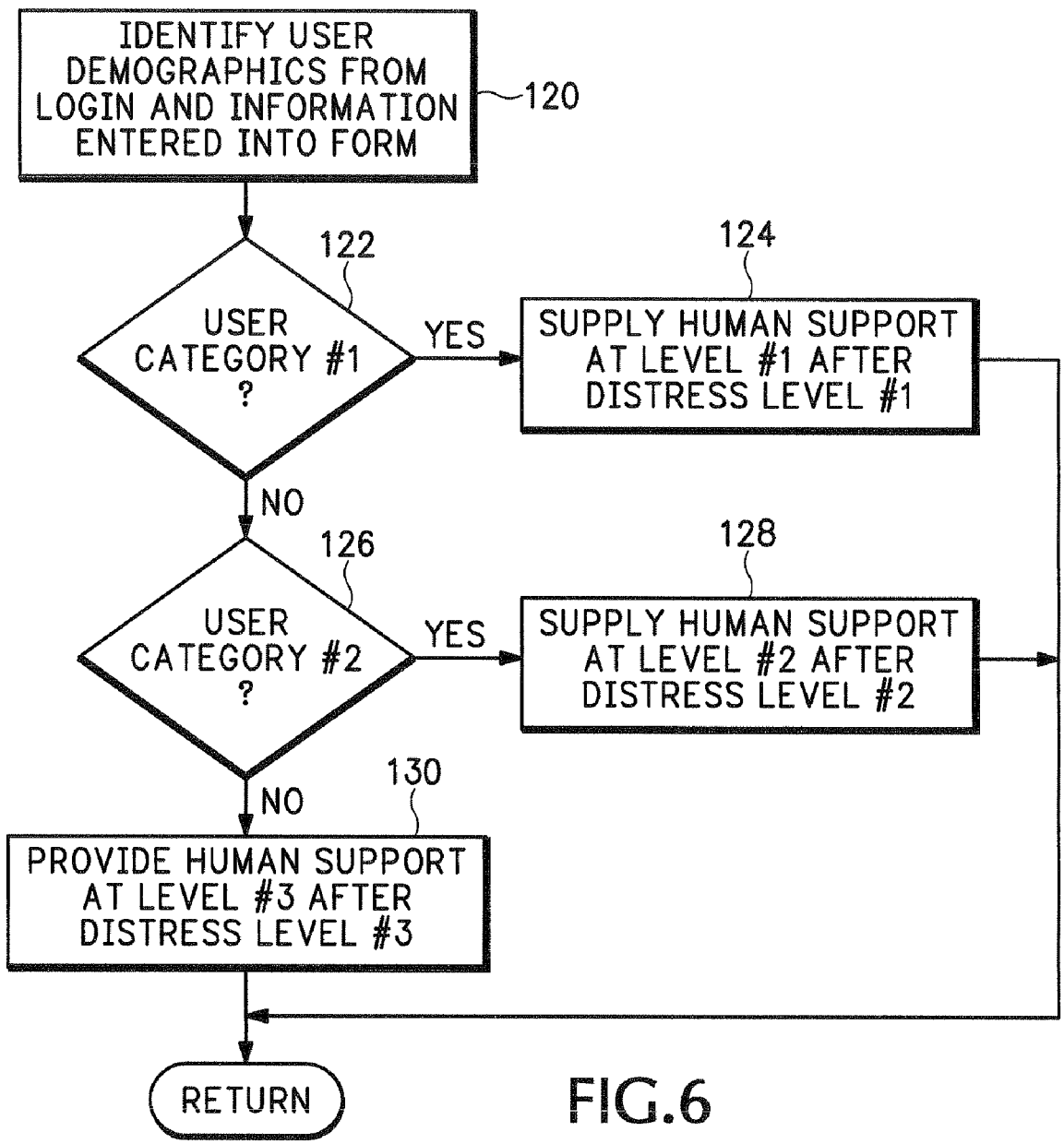
FIG. 6 is a flow diagram explaining how different levels of support are provided according to user demographics.

Referring to FIG. 6, criteria for providing automated or human on-line support can also be based on customer demographics. For example, a user may enter particular demographic information into the form in FIG. 2. This could include information such as yearly income, geographic location, marriage status, age, etc. The web application could also determine if the user is an existing enterprise customer, such as a user requesting a home loan that currently has a saving and/or checking account with the same financial institution.

Any or all of these user demographics are identified in operation 120 of FIG. 6. This information again could be extracted from information entered into the form 30 in FIG. 2 or could be identified during a website login procedure where the user supplies certain demographic information to the enterprise web site. The form 30 can use the user demographics to determine what level of human on-line support to provide to the user.

Operation 122 identifies users in a first high end user category #1. For example, the user may have entered a yearly income of over $100,000 in income field 36B in FIG. 2 or may have been identified as a current enterprise customer. Accordingly, the form provides the users in category #1 a first level of human support for a first level of detected user distress. For example, the form in operation 124 may immediately provide an on-line phone number or automatically have the call center agent call the user whenever it appears that the user is struggling with filling out form 30. As also mentioned above, a high enough income level identified in operation 122 may also cause the call center agent to immediately call the user in operation 124 regardless of whether or not the user is experiencing any problems.

Alternatively, form 30 may determine in operation 126 that the user has a second lower user demographics category #2. For example, the user may have an income below $100,000 or may not currently be an enterprise client. The form 30 in operation 128 then provides a second level of human support after some second higher level of user distress #2 is detected. For example, an enterprise phone number may be displayed in operation 128 only after the user has been struggling with a form for a longer time period than users in category #1. Otherwise, in operation 130 the form may provide human support at an even lower third level #3 after detecting an even higher level of user distress #3.

The form 30 in FIG. 2 may be configured so that particular user profile information is located at the beginning of the form. This allows the form to immediately determine what level of support will be provided.

Syntactic Support

Certain techniques are currently being used with electronic forms to help a user enter the correct information. Some form fields, for example, include drop down menus that identify all acceptable entries into that particular field. For example, a state field may provide the user with a drop down menu that identifies every state. The user selects one of the identified states and the selected state is then automatically entered into that field. Unfortunately, there are other fields that have too many possible valid entries and therefore can not use drop down menus. The intelligence of the forms can be used to try and identify invalid entries and then help the user identify the correct entry.

Figure 7:
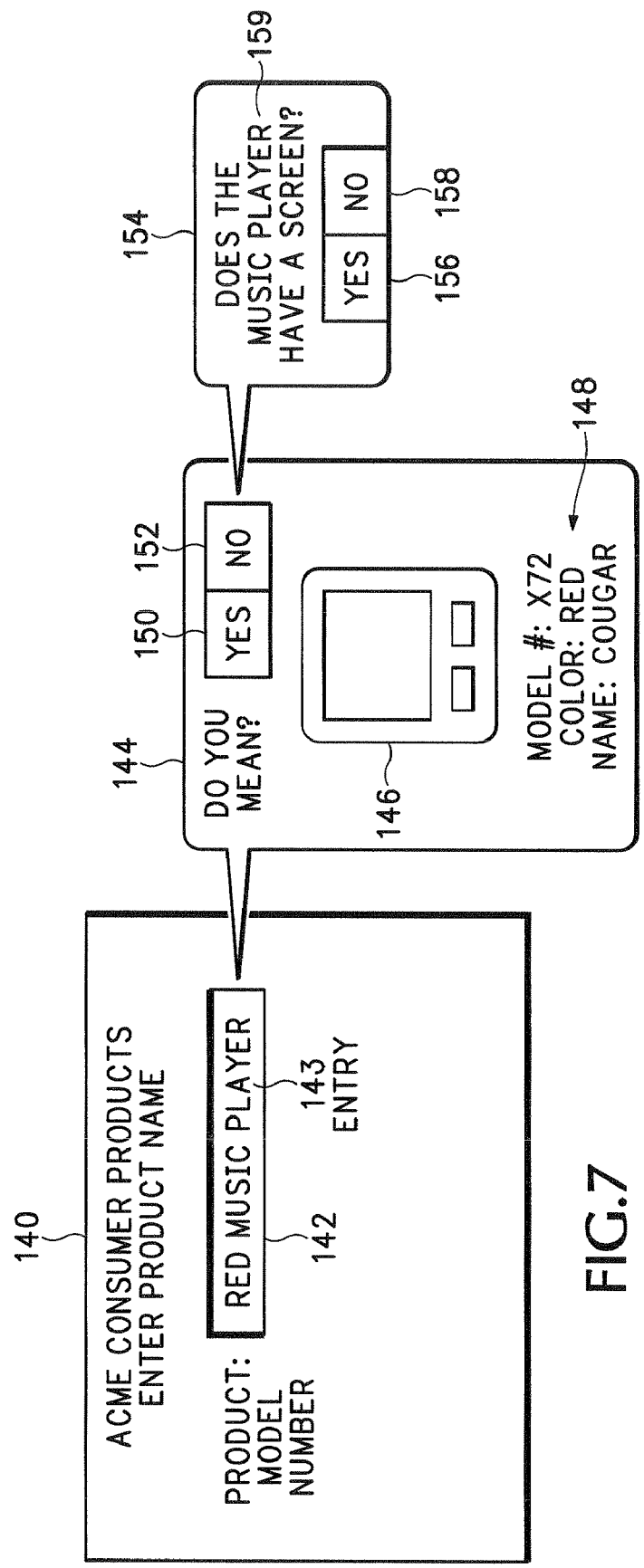
FIG. 7 is a diagram showing how a form can present suggestions for filling out fields in a form.

FIG. 7 shows an example of how an intelligent form 140 can be used to help a user enter correct information into a field 142. In this example, the web site may be operated by an enterprise that sells and supports thousands of different consumer products. Form 140 requires the user to enter a product model number. It may not make sense for the web site to provide a drop-down list of all product model numbers, since the user probably would not know the correct model number, even if it were displayed.

The form 140 can interpret information the user enters into field 142 and then first determine if the user has submitted a valid entry. If the entry is valid, then no further support action may need to be provided. When an invalid entry 143 is entered, however, the form 140 may automatically display a popup window 144 that then helps the user identify the correct information.

A query engine can be used in conjunction with the form 140 that tries to determine the type of product the user intended to identify in field 142. The query engine can make suggestions as to the product the user intended to identify, based on the information 143 entered into field 142, the context related to form 140, and on the types of products offered by the enterprise that would qualify as valid entries for field 142. If the query engine can determine the likely product, then the model number, features, and name of the product 148 can be displayed in popup window 148. Further, an image 146 of the likely product can also be displayed in the popup window 144. If the user selects the yes button 150 in popup window 144, then the correct model number: X72 will automatically be entered into field 142.

The query engine may not be able to even suggest a possible product based on the user input 143, or the query engine may identify the wrong product in popup window 144 or other user interface embodiment. In either case, the form 140 may present additional questions to the user that will help the query engine identify the correct product. For example, the product shown in popup window 144 may not be the product intended by the user. The user by selecting the no button 152 automatically causes the form 140 to display another popup window 154. Window 154 may then query the user for additional information 159.

Based on one or more presented and answered questions 159, the query engine may then be able to suggest other possible products in popup window 144. If the query engine cannot suggest any possible products based on entry 142, the form 140 may not display popup window 144 and initially display popup window 154. Certain forms with legal significance, such as a form for purchasing a product, may also require the user to confirm that any information automatically entered into a field is correct.

After some number of questions 159 the query engine still may not be able to suggest a product in popup window 144. Or multiple different suggestions all may be rejected when the user repeatedly selects the no button 152. Similar to the other forms described above, the form 140 may then automatically provide some level of human interaction by displaying something similar to the human support section 40 shown in FIG. 2.

Thus, the example embodiment described above provides many different support triggers and possible support responses. In summary, some of the support triggers include:
Support Triggers
Type of incorrect data entered by the user.
User's demographic information.
User skipping a field.
User taking too long to complete a field.
User asks a question unrelated to a field.
User asks question indicating frustration or anger.
Some of the actions based on these support triggers may include:
Actions
Display a popup window or other user interface embodiment that explains the field.
Display a popup wizard that asks specific questions:
  Are you having trouble?
  What are the features on the product you are thinking about?
Auto-correct information entered into a field and ask user to confirm information.
Auto-escalate the transaction to a call center agent and have the call center agent interactively support the user.
Automatic Field Suggestions Referring to FIG. 8, one embodiment of the intelligent forms as described above in FIG. 7 may use a query engine 162 or some alternative suggestion engine to automatically provide suggestions in real time as a user is entering information into different fields 164. For example, the user may type the entry 165 "RED MUSIC PLAYER" into field 164. The form 160 may supply the text 165 to the query engine 162 in real time as the user is entering the information into field 164 or alternatively supply the information to query engine 162 after the user presses an enter or select key or moves the cursor out of field 164.

The query engine 162 can then identify the meaning of the question by querying a database or other content store that may be associated with the intent or context of entry 165 and that is relevant to the field 164 in form 160. For example, form 160 may be used for purchasing MP3 devices. Accordingly, the query engine 162 will search for red MP3 music players that are available for purchase. Any identified products can be displayed as dropdown items 166A, 166B, and 166C. The user can then click on any of the displayed products 166A, 166B, or 166C that match the user intent. The information for the selected product is then automatically entered into field 164.

The form 160 can also track other context associated with previous user activities (web session) to then automatically suggest or help fill in field 164. For example, the user after entering the enterprise web site may have entered a web page that describes a red MP3 player. A context tracker application operating in conjunction with query engine 162 may automatically track these previous activities during the user session and accordingly enter the product model number from the previously viewed web page into field 164.

In another embodiment, the user may have previously conducted a search using a third party search engine. The query engine/context tracker 162 can also attempt to identify the intent of entry 165 based on the information viewed by the user during the previous search. The user may have also previously clicked on a link to a particular web site for product during the web session or may have previously purchased other products from the enterprise related to the products associated with form 160. The query engine/context tracker 162 combines all of this user information together to determine both the context or intent of entry 165 either before the entry 165 is actually typed into field 164 or as the entry 165 is being typed into field 164. The form 160 then provides any suggestions 166A-166C in real time to the user.

As described above, based on this prior user activity, the query engine 162 may be able to provide suggestions before the user enters any information in to field 164, start 10 suggesting products after the user enters the first word "red" or first few words into field 164, or suggest products after the entire entry 165 has been entered. If the correct product is suggested, the user can then simply click on the suggestion 166 without having to fill in the rest of the entry 165 or without reentering the correct information into field 164.

The query engine 162 can use similar intelligent query engines as described in co-pending U.S. patent applications, Ser. No. 11/382,670, filed May 10, 2006, entitled: GUIDED NAVIGATION SYSTEM; Ser. No. 11/464,443, filed Aug. 14, 2006, entitled: METHOD AND APPARATUS FOR IDENTIFYING AND CLASSIFYING QUERY INTENT; and Ser. No. 10/820,341, filed Apr. 7, 2004, entitled: AN IMPROVED ONTOLOGY FOR USE WITH A SYSTEM, METHOD, AND COMPUTER READABLE MEDIUM FOR RETRIEVING INFORMATION AND RESPONSE TO A QUERY which are all herein incorporated by reference. Of course other types of query and search engines can also be used.

Associated Fill-ins

Referring to FIG. 9, a form 160 may automatically fill in fields or offer suggestions for filling in fields based on the inputs entered into previous fields. For example, a user may enter information into an income field 168A and a marital status field 168B of a form 168. Based on the information entered into fields 168A and 168B, a knowledge application associated with form 168 may automatically suggest different entries for a type of account field 168C.

For example, based on the user's income, marital status, occupation, etc., the form 168 or the web site supplying form 168, may have predetermined that 70% of the time the user selects a joint account credit card application 168E and 20% of the time the user then selects a travel credit card application 168F.

Accordingly, the form 168 may present the most popular types of accounts in dropdown menu 168D associated with the user demographics entered into previous fields 168A and 168B. When the user clicks on suggestion 168E or 168F, the selected account type is automatically entered into field 168C.

Another embodiment of form 168 may automatically enter information into a particular field based on one or more previous entries. For example, the user may enter a zip code into another field in form 168. The form 168 may then automatically fill in a city and state into other fields associated with the previously entered zip code. If there is more than one city associated with the same zip code, the form 168 may enter the city most frequently entered into the city field by other users, or can provide a drop down menu that asks the user to confirm the name entered into the city field is correct. Alternatively, as described above, the form may present another drop down menu, like dropdown menu 168D, that lists all of the cities and towns associated with the previously entered zip code.

The web site operating form 168 analyzes statistics from similar forms 168 that have been filled out in the past by other users and then identifies the fields that are likely to be filled in with particular entries based on different combinations of previously entered fields. The form 168 can then be programmed to automatically provide the common suggestions or automatically fill in the fields whenever the combination of information previously entered into different combinations of other fields correspond to a common response or common set of responses in another field. Alternatively, the enterprise web site can monitor the inputs from users and then send the suggestions back to the form 168 operating on the user site.

The automatic field fill in and suggestion feature can be used for any field where the information for one field can be assumed to be correlated to the inputs from other fields.

Content Modified Forms

Figure 10:
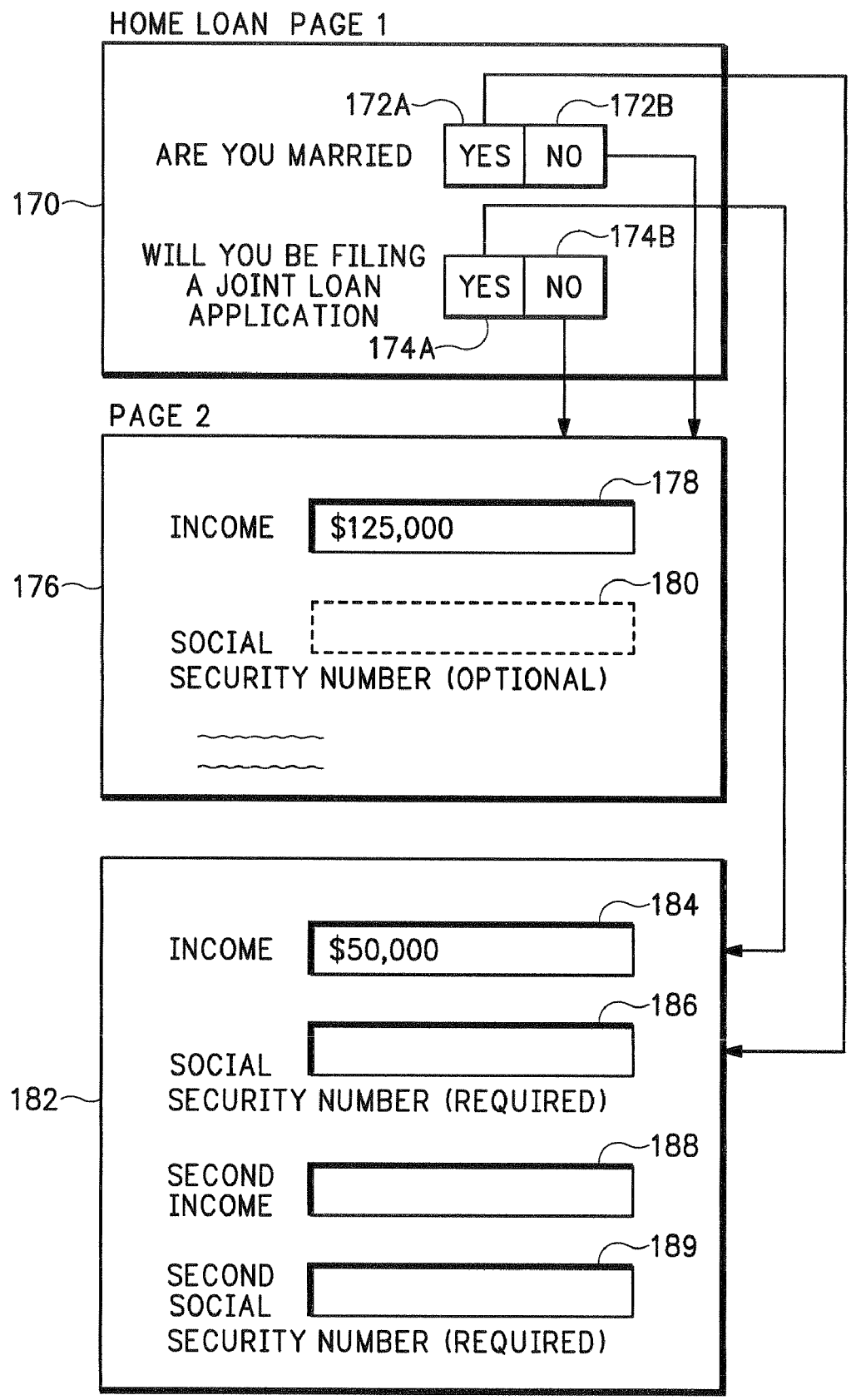
FIG. 10 is a diagram showing how different parts of forms can be displayed to a user according to information input into different fields.

Referring to FIG. 10, forms may automatically change based on the information entered by the user. Form 170 may include a field 172 asking the marital status of the user and a field 174 inquiring whether or not the user is filling out a joint application. If the user selects "NO" in fields 172B and 174B, the form may then automatically provide a form that does not include any of the information that would normally exist in a joint home loan account. In other words, there would be no fields relating to the personal information of the user's spouse in web page 176.

Other fields may or may not be presented based on any additional information the user enters into web page 176. For example, the user may enter a particular number into income field 178 on page 176. If the user's income is high enough, page 176 may display a following social security field 180 as optional or display a popup window that allows the user to communicate the social security number to a call center agent over the phone.

Alternatively, information may be entered into fields 172A and 174A of web page 170 that indicates a joint home loan. Accordingly, a web page 182 of the form is displayed that includes additional fields 188 and 189 associated with the second partner. Further, the user entering information into field 184 may have an income below some predetermined threshold. This could cause page 182 to display other fields, such as the social security number field 186, as required instead of as being optional as presented in page 176.

Analytics

The web site can also provide analytics that monitor the number of successful and unsuccessful on-line transactions, the type of on-line transactions, the types and forms of search questions asked, and the number of times each successful and unsuccessful transaction required human assistance. Also the type of human assistance can be tracked, such as user initiated, form initiated, and call center initiated based on a detected user problem. The amount of on-line support can then be adjusted to operate within a maximum yield zone on curve 16 in FIG. 1.

Figure 11:
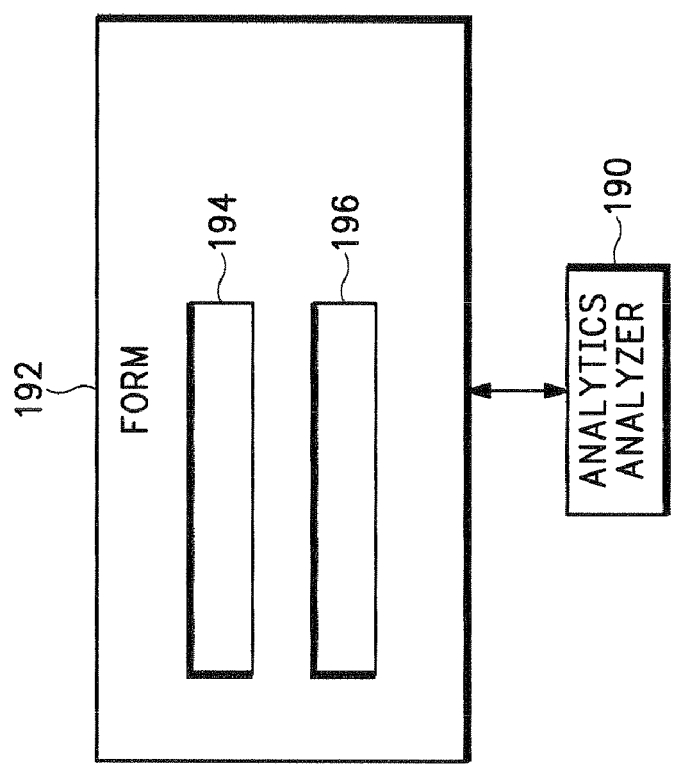
FIG. 11 is a diagram showing how the information input into the forms can be analyzed for providing support.

FIG. 11 shows an analytics analyzer 190 that tracks these types of information associated with users filling out different forms. For example, the analytics analyzer 190 can determine what field in a form 192 caused a user to abandon an on-line transaction. The analytics analyzer 190 can also determine what pages or fields were the most difficult for the user to fill in (took the most time or required accessing help information or search) and how long it required a user to complete each page and each individual field. The analytics analyzer 190 can also determine what types of problems a user experienced filling out form 190 based on the types of questions the user asked while filling out the fields 194 and 196. Different demographic data entered into forms 192 by different users can also be tracked.

This analytic information can also be used to provide the auto-fill and auto-suggestion features described above. For example, based on inputs commonly entered into field 194, the analytics analyzer 190 may be able to determine that there is a 75% chance that the user will enter a particular input into field 196. Accordingly, the form 192 may be programmed to present the predetermined popular input to the user either before or as the user enters field 196.

The analytics analyzer 190 can also constantly evaluate what suggestions and auto-fill data is being used by users. For example, a particular form 192 may repeatedly provide three different suggestions for filling in field 196, based on the previous input to field 194 or based on questions asked in a search window. After some period of time it may be determined that users seldom or never selects a second suggestion. Accordingly, the analyzer 190 detects this activity and then causes the form 192 to drop the second suggestion from the drop down menu or alternatively moves the second suggestion to the bottom of the drop down menu. The analyzer 190 can also be used to display the percentage of users that have previously selected different suggestions from the drop down menu as previously shown in FIG. 9.

The information obtained by the analytics analyzer 190 can be used to maximize the "sweet spot" for the yield curve 16 previously shown in FIG. 1. For example, the analyzer 190 determines what percentage of transactions are aborted and what level of support is provided for those transactions. Then based on the yield curve 16 in FIG. 1, the enterprise can determine whether or not to increase the amount of available human support for the forms associated with that transaction.

For example, users having an income over $100,000 may associate form 192 with a high value transaction. It may also be determined that users for the high valued transaction commonly abandoned form 192 while attempting to fill in field 196. Form 196 might then be modified to provide more human support or quicker human support whenever a user starts struggling with field 196. For instance, the amount of time allowed for a user to complete field 196 before providing call center support may be reduced. Alternatively, instead of simply displaying a help phone number, the form 192 may increase the level of support by having a call center agent call the user whenever there appears to be a problem filling out field 196.

Saving Information

The forms may also automatically save information from uncompleted or completed forms. This information may be used to then repopulate fields in an uncompleted form from an earlier user session. For example, a user may only partially complete an electronic form when applying for a home loan. The user for some reason may then either intentionally or unintentionally close or exist the web page containing the home loan form. The home loan form may automatically save the information previously entered into the form. This can be done using cookies on the user site or saving the information to the enterprise web server. The web application can determine that the form was not completed by identifying empty fields or confirming that the form was never submitted back to the web server for completing the transaction.

The web server can then sent an email reminder back to the user the next time the user logs into the enterprise web site. The email can include a link that when selected takes the user back to the previously entered form. The enterprise server can then fill in the form with any information entered by the user during the previous session. If the user deselects the link contained in the email or selects some delete icon, the web server may then delete the information captured from the previous session.

Displaying Progress

Figure 12:
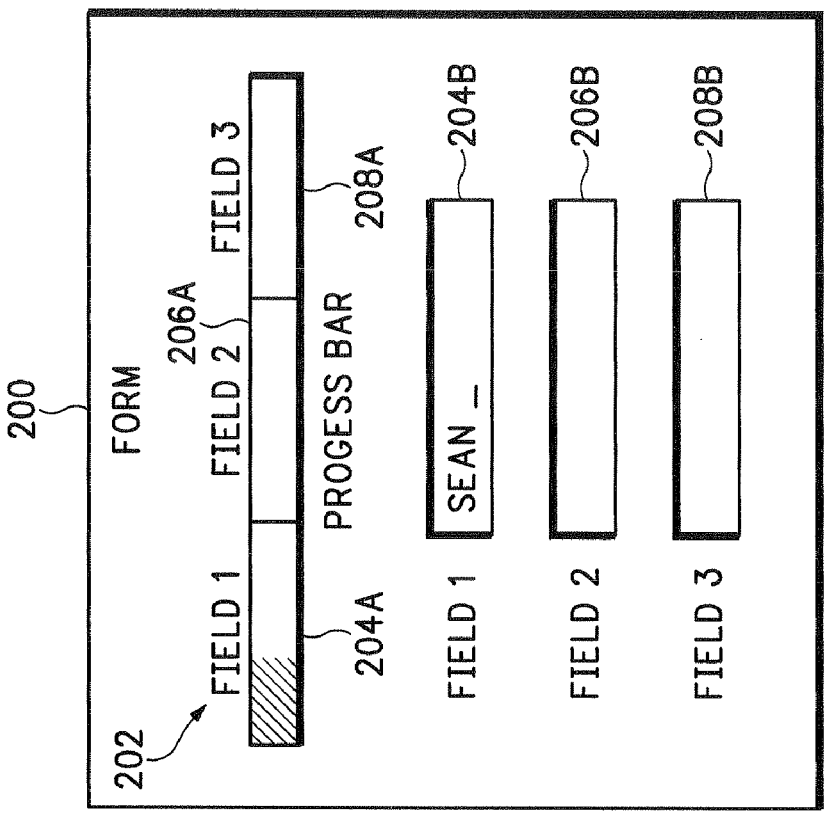
FIG. 12 is a diagram of showing how a user is progressing while filling out a form.

FIG. 12 shows some examples of how a user can determine how they are progressing in a form 200. The form 200 may display a progress bar 202 that may be field based and have separate sections 204A, 206A, and 208A each associated with a different field 204B, 206B, and 208B respectively. Each section of progress bar 202 can be filled in by form 200 according to the percentage of associated field completion. For example, field 204B may be associated with filling in a user name. The associated progress bar section 204A may be filled in half way after the first name of the user is entered.

Alternatively, the process bar 202 is not separated into different sections 204A, 206A, and 208A. However, the progress bar 202 is filled in according to the relative difficulty of each field 204B, 206B, and 208B. For example, field 204B may be relatively simple. Accordingly, only a small portion of progress bar 202 is filled in after a user completes field 204B. However, field 206B may be substantially more complex. Accordingly, completing field 206B fills in a substantially larger portion of progress bar 202. Field 208B may be of average complexity and would then fill in approximately a third of progress bar 202 when completed.

In another embodiment, the progress bar sections 204A, 206A, and 208A may be time based and filled in by the form 200 according to an amount of time a typical user spends completing the associated fields 204B, 206B, and 208B. In this embodiment, the progress bar sections 204A, 206A, and 208A are weighted according to the level of difficulty and/or the typical amount of time required to fill out the field. This information can be obtained from the analytic analyzer 190 shown in FIG. 11.

For example, the first field 204B may be relatively easy to fill out in comparison to filling out the information in field 206B and usually take less time to complete. Accordingly, the form 200 may fill in that part of progress bar section 204A as a smaller portion than progress bar section 206A. Either way, the form 200 fills in the progress bar 202 according to some amount of time normally required for users to complete particular fields 204B, 206B, and 208B.

The form 200 can also display next to the progress bar 202 the average amount of time previous users have spent filling out form 200. The current amount of time the user has taken to fill out the form can then be displayed next to the average time. Also, the progress bar 202 can have different sections 204A, 206A, and 208A associated with different fields, subfields, or pages that are associated with the same form 200.

All of the actual user times required to complete the different fields and forms can be periodically monitored and their relative proportions in the associated progress bars 202 accordingly updated to represent changing user completion trends.

The relative expected completion times for the different fields, pages, and forms can be used as described above to determine when help should be provided to a user. For example, the average amount of time required for a user to fill in a particular field can be determined. Form 200 may then automatically display a help window whenever a user takes longer than the identified average user time.

It should also be understood that any of the intent based information retrieval systems that are described in the pending patents that have been previously been incorporated by reference can be used to identify and provide to the user any of the intelligent forms described above.

Figure 13:
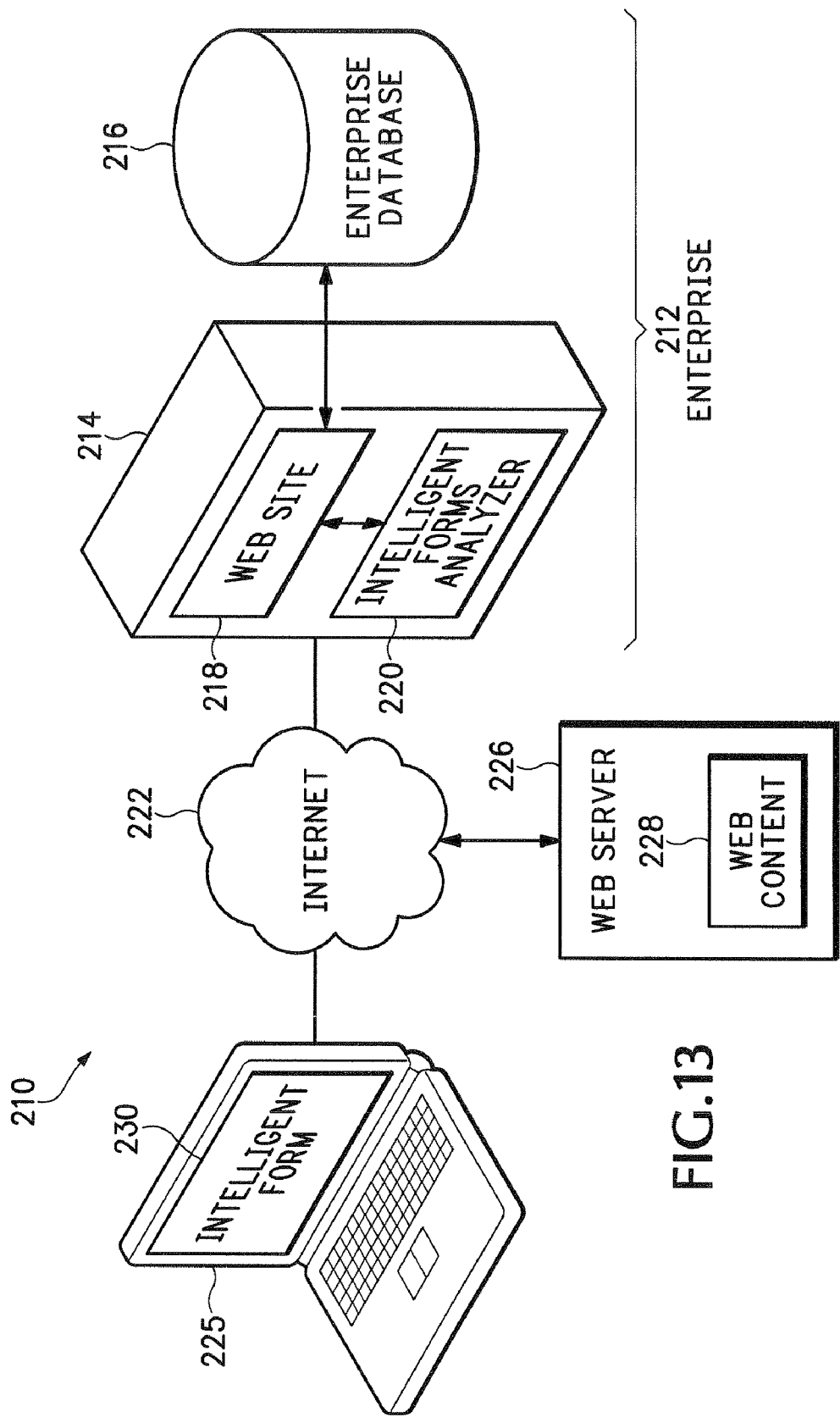
FIG. 13 is a block diagram showing a network that may use intelligent forms.

FIG. 13 shows a computer network system 210 that may be used in conjunction with any of the intelligent form operations described above. The system 210 includes an enterprise 212 that has one or more enterprise servers 214 and one or more enterprise databases 216 that contain content associated with enterprise 212. For example, the enterprise 212 may be an on-line retailer that sells books as well as other retail items. In this example, the enterprise database 216 may contain lists for all of the books available for purchase. In another example, the enterprise 212 may be associated with a car manufacturer or car dealership and the enterprise database 216 could include vehicle information. These are, of course, just two examples, and any type of business or entity is represented by enterprise 212.

Other web servers 226 may operate outside of the enterprise 212 and may include associated web files or other web content 228. Examples of content stored in enterprise database 216 and in file server 228 may include HTML web pages, PDF files, Word® documents, structured database information or any other type of electronic content that can contain essentially any type of information.

Some of the information may be stored in a structured format referred to generally as structured content. For example, data may be stored in the enterprise database 216 in a preconfigured format specified for enterprise 212. For example, a book or vehicle price list may be considered structured content. Alternatively, other information that is contained in enterprise database 216, or contained on other web servers 226, may be considered non-structured content. This may include HTML web pages, text documents, or any other type of free flowing text or data that is not organized in a preconfigured data format.

Intelligent on-line web page form 230 may be displayed on a terminal 225 through a User Interface (UI). The terminal 225 in one example may be a Personal Computer (PC), laptop computer, wireless Personal Digital Assistant (PDA), cellular telephone, or any other wired or wireless device that can access and display content over a packet switched network. In this example, the intelligent form 230 is sent over the Internet 222 to terminal 225 from an on-line web site 218 operated on enterprise server 214.

An intelligent forms analyzer 220 may classify, identify, navigate, analyze, search or provide any of the operations described above with respect to intelligent form 230. Other data retrieval, searching operations, intent, and/or context analysis described above may also be performed by analyzer 220. However, any combination or sub-combination of operations described above could also be provided and executed locally on terminal 225.

The enterprise server 214 includes one or more processors that are configured to operate the web site 218 and intelligent forms analyzer 220. The terminal 225 also includes one or more processors for operating and displaying the intelligent forms 230. The operations performed by terminal 225 and servers 214 and 226 could be provided by software computer instructions that are stored in a computer readable medium, such as memory on server 214 or terminal 225. The instructions are then executed by processors in server 214 or terminal 225, respectively.

It should be understood that the examples presented below are used for illustrative purposes only and the scope of the invention is not limited to any of the specific examples described below. For example, another application could be a mortgage calculator on a bank site. A mini intelligent form asks a few questions (house price, % down, etc) and outputs a meaningful number such as what your monthly mortgage payment would be. This is another example of an intelligent form where the user may need guidance while entering information.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A method, comprising:
 displaying a plurality of web page fields;
 monitoring actions associated with entering information into the plurality of web page fields;
 in response to observing a predetermined characteristic associated with a monitored action of a web page field of a first subset of the plurality of web page fields, causing a first level of on-line support to be provided responsive to the occurrence of the respective monitored action;
 wherein the first level of on-line support includes human support; and
 in response to observing the same predetermined characteristic associated with a monitored action of a web page field of a second different subset of the plurality of fields, causing a second different level of on-line support to be provided responsive to the occurrence of the respective monitored action;
 wherein the second different level of on-line support does not include human support.

2. The method according to claim 1, further comprising:
 identifying, of the plurality of web page fields, a web page field currently being viewed or filled out; and
 responsive to the monitoring, displaying a particular set of questions and/or answers corresponding to the identified web page field.

3. The method according to claim 1, further comprising:
 identifying, of the plurality of web page fields, a web page field currently being viewed or filled out;
 identifying a context for the identified web page field;
 receiving a question regarding one of the plurality of web page fields;
 identifying an intent of the question according to the identified context; and
 conducting a search according to the identified intent.

4. The method according to claim 3, further comprising displaying new questions associated with search results.

5. The method according to claim 1, further comprising:
 tracking the information entered into the second subset of the plurality of web page fields;
 responsive to the tracking, detecting invalid entries; and
 providing a third level of on-line support for the web page fields of the second subset when an invalid entry is detected.

6. The method according to claim 5, further comprising:
 identifying ones of the detected invalid entries that indicate a user does not understand associated fields or that indicate user frustration filling out associated fields; and
 providing a fourth level of on-line support for the web page fields of the second subset for the identified invalid entries.

7. The method according to claim 1, further comprising:
 identifying a number of times information is entered and then deleted from a same one of the plurality of web page fields; and
 displaying help options according to the number of times information is entered and then deleted from said one of the plurality of web page fields.

8. The method according to claim 1, wherein the second level of online support includes displaying help options, and wherein the method further comprises:
 tracking amounts of time spent filling out the plurality of web page fields on a per field basis;
 displaying a first subset of the help options for a web page field of the second subset of the plurality of fields; and
 displaying a second different subset of the help options for said web page field of the second subset of the plurality of fields when a tracked amount of time for said web page field exceeds a preset threshold.

9. The method according to claim 1, wherein the web page fields of the first subset of the plurality of web page fields are assigned a different label, tag, value, or index in a table or index than the web page fields of the second subset of the plurality of web page fields.

10. The method according to claim 1, further comprising:
identifying demographic information for users accessing the plurality of web page fields;
assigning user classifications according to the identified demographic information; and
causing a third level of online support to be automatically provided for only some of the users.

11. The method according to claim 10, wherein the demographic information includes income information.

12. A method, comprising:
displaying one or more web pages having different fields;
monitoring actions associated with entering information into the different fields;
dynamically varying what types of support are provided for entering the information into the different fields according to the monitored actions;
identifying different priorities associated with different types of transactions on one or more of the web pages;
providing different levels of on-line support for filling out the web pages according to the associated priorities;
detecting problems or delays in filling out the different fields of the web pages for the different transactions;
providing on-line support more quickly for detected problems or delays in higher priority transactions than for detected problems or delays in lower priority transactions; and
automatically calling users after detecting problems or delays in the higher priority transactions and only displaying help phone numbers after detecting problems or delays in the lower priority transactions.

13. A memory device having stored thereon instructions that, when executed, result in:
receiving entries in a plurality of web page fields of a single web page form;
inspecting the received entries; and
according to the inspection, causing a first level of on-line support to be provided for a first one of the plurality of web page fields responsive to the inspection and causing a second different level of on-line support to be provided responsive to the inspection for a second one of the plurality of web page fields;
wherein the first level of on-line support includes human support, and wherein the second different level of on-line support does not include human support.

14. The memory device according to claim 13, further comprising instructions that, when executed, result in:
identifying an invalid entry according to the inspection; and
displaying a pop-up for one of the plurality of web page fields that corresponds to the invalid entry, the pop-up providing suggestions for filling in the corresponding web page field.

15. The memory device according to claim 14, further comprising instructions that, when executed, result in displaying questions in the pop-up that help identify a valid entry for the corresponding web page field.

16. The memory device according to claim 13, further comprising instructions that, when executed, result in:
identifying meanings for the received entries by querying a database that is associated with a context or intent of the web page form, the plurality of web page fields, or the received entries;
displaying different information that corresponds with the identified meanings; and
filling in the plurality of web page fields with selected portions of the displayed information.

17. The memory device according to claim 13, further comprising instructions that, when executed, result in:
storing prior search or website activity for a user accessing the web page form;
identifying meanings according to the prior user activity; and
displaying different suggestions for filling out the plurality of web page fields in the web page form according to the identified meanings.

18. The memory device according to claim 13, further comprising instructions that, when executed, result in:
receiving an entry in a first one of the plurality of web page fields;
determining a user demographic according to the first entry;
predicting a likely entry for a second one of the plurality of web page fields according to the user demographic; and
displaying the likely entry for selection and insertion into the second one of the plurality of web page fields.

19. The memory device according to claim 13, further comprising instructions that, when executed, result in:
analyzing previously submitted entries in a similar previously submitted web page form;
receiving a first entry in the plurality of web page fields;
predicting a likely second entry to be filled in the plurality of web page fields according to a result of the analysis; and
displaying the predicted likely second entry for filling in the plurality of web page fields.

20. The memory device according to claim 19, further comprising instructions that, when executed, result in:
tracking the acceptance or rejection by a user of previously displayed likely entries; and
predicting the likely second entry based at least in part on the tracking.

21. The memory device according to claim 13, further comprising instructions that, when executed, result in:
identifying which fields of the plurality of web page fields most commonly cause abandonment of the web page form; and
correlating the first level of on-line support to the first web page field according to the identification.

22. The memory device according to claim 13, further comprising instructions that, when executed, result in:
saving information from a plurality of web page fields of a previously opened web page form in a prior on-line web-session;
detecting a same user opening up the current web page form; and
filling in the plurality of web page fields in the currently opened web page form with the saved information.

23. The memory device according to claim 13, further comprising instructions that, when executed, result in:
tracking what web page fields in the web page form have been completed; and
displaying a completion indicator that shows what amount of the web page form is completed.

24. The memory device according to claim 23, further comprising instructions that, when executed, result in:
weighting the difficulty of filling out the plurality of web page forms; and
showing what amounts of the web page form have been completed according to the weighting.

* * * * *